United States Patent [19]

Nishizawa et al.

[11] Patent Number: 4,571,624
[45] Date of Patent: Feb. 18, 1986

[54] TWO-DIMENSIONAL SOLID-STATE IMAGE SENSOR DEVICE

[75] Inventors: Junichi Nishizawa; Takashige Tamamushi, both of Sendai; Koji Shimanuki; Masafumi Inuiya, both of Ashigarakami, all of Japan

[73] Assignees: Fuji Film Co., Tokyo; Junichi Nishizawa, Miyagi, both of Japan

[21] Appl. No.: 561,444

[22] Filed: Dec. 14, 1983

[30] Foreign Application Priority Data

Dec. 14, 1982 [JP] Japan .................. 57-218931

[51] Int. Cl.$^4$ .............................................. H04N 3/12
[52] U.S. Cl. ...................................... 358/212; 357/24; 250/578
[58] Field of Search .............................. 358/212, 213; 357/24 LR, 22, 30, 43; 250/578

[56] References Cited

U.S. PATENT DOCUMENTS

| | | | |
|---|---|---|---|
| 4,236,829 | 12/1980 | Chikamura et al. | 357/16 |
| 4,317,127 | 2/1982 | Nishizawa | 357/42 |
| 4,326,209 | 4/1982 | Nishizawa et al. | 357/24 |
| 4,338,618 | 7/1982 | Nishizawa | 357/43 |
| 4,462,047 | 7/1984 | Fujimoto et al. | 358/212 |
| 4,518,863 | 5/1985 | Fukuora et al. | 250/578 |

Primary Examiner—Gene Z. Rubinson
Assistant Examiner—Robert G. Lev
Attorney, Agent, or Firm—Cushman, Darby & Cushman

[57] ABSTRACT

A two-dimensional solid-state image sensor device, comprising: a plurality of picture cells which are two-dimensionally arranged in column and row directions, and each of which comprises a static induction transistor having drain and source regions with one conductivity type which are disposed on opposite sides of a high resistance semiconductor channel region, and control and shielding gate regions with the other conductivity type which are adjacent to the channel region to control a current flowing between the drain and source regions, and a transparent electrode disposed via a capacitance on at least a portion of the control gate region, in a manner that light is incident through the transparent electrode to the control gate region in which the charge produced by the light excitation is stored to control the current; a plurality of selection lines, each of which connects the control gate regions in each column in common via the capacitances; and a plurality of signal readout lines, each of which connects the drain or source regions in each row in common. Each picture cell is selected in the column and row directions so that a signal is read out therefrom. The shielding gate regions are electrically connected in common in the column or row direction and electrically isolated in the remaining direction so that voltages are independently applied to the pixels.

9 Claims, 18 Drawing Figures

FIG_3

FIG_4

TWO-DIMENSIONAL SOLID-STATE IMAGE SENSOR DEVICE

BACKGROUND OF THE INVENTION

1. Field of the Invention

The present invention relates generally to a two-dimensional solid-state image sensor device and more particularly to a two-dimensional solid-state image sensor device of the type in which each picture cell consists of a static induction transistor which functions as photodetector and switching element and in which a plurality of such picture cells are two-dimensionally arranged in a mosaic array.

2. Description of the Prior Art

In a conventional solid-state image sensor device, each picture cell comprises a diode for sensing a light image and a switching transistor. That is, a light image is detected by the diode and the sensed signal per se is outputted as video signal. As a result, the conventional solid-state image sensor device has disadvantages in that the signal output is small and its sensitivity is low. Thus, the degree of integration of the conventional image sensor is limited in terms of sensitivity.

The applicant has disclosed, in Japanese Patent Application No. 204656/1981, a solid-state image sensor device of the type in which a static induction transistor with a high light sensitivity is used so that a light signal is stored in its gate region and a video signal is derived by controlling the current flowing between the source and the drain in response to the potential at the gate region, whereby a high signal output is obtained.

Figure 1:
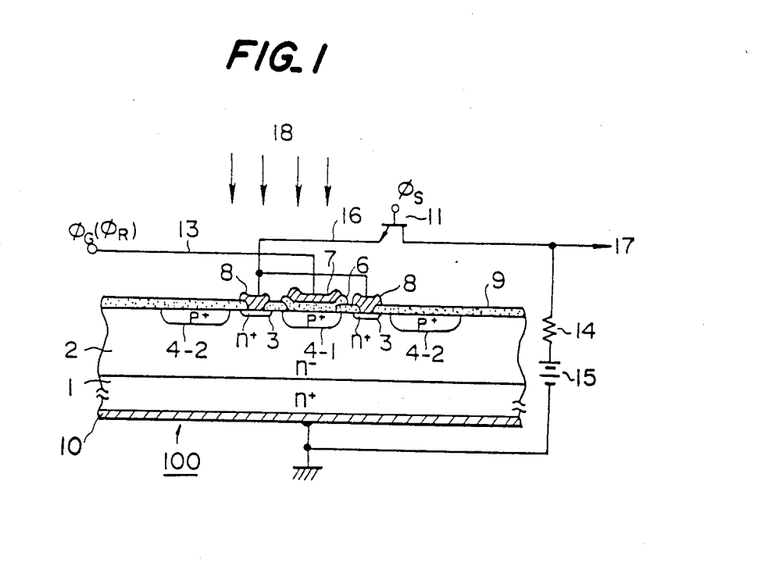
FIG. 1 is a sectional view showing a picture cell to be used in a two-dimensional solid-state image sensor device.

FIG. 1 shows a sectional view of an embodiment of a picture cell used in the above-described solid-state image sensor device. In FIG. 1, reference numeral 1 designates a silicon n+substrate; 2, an n−(or intrinsic) semiconductor region which has a high resistance and serves as channel; 3, an n+drain region which has a high impurity concentration and serves as drain region; 4-1 and 4-2, p+regions which have a high impurity concentration and are formed so as not to interrupt the channel region and serve as a control gate and a shielding gate, respectively; and 6, an insulation layer or film such as an SiO$_2$ or Si$_3$N$_4$ film for providing a capacitor over the control gate region. 7, 8 and 10 are gate, drain and source electrodes. At least the gate electrode 7 is transparent to an incident light 18. 9 is surface protection layer or film such as SiO$_2$.

Reference numeral 11 designates a switching transistor; $\phi_s$, a control signal applied thereto; 13, a selection line for applying a read pulse voltage $\phi_G$ to the gate electrode 7 from a picture cell selection circuit (not shown); 14, a load resistor; 15, a video voltage supply; 16, a signal readout line; 17, an output terminal; and 18, a light input.

Of the two gate regions 4-1 and 4-2, the p+region 4-1 is the control gate which controls the current flow between the source and the drain in accordance with the storage of charge induced in response to the light input. The control gate 4-1 together with the insulating layer or film 6 and the electrode 7 contstitute a capacitor. Another p+region 4-2 is the shielding gate and surrounds the control gate 4-1 and the n+drain region 3. The control gate 4-1 and the shielding gate 4-2 produce a potential barrier in the channel.

While FIG. 1 shows the structure of only one picture cell, it should be noted that when many picture cells are formed, the shielding gate 4-2 serves to isolate one picture cell from others by a depletion layer. A potential may be applied to the shielding gate 4-2. Alternatively, the shielding gate 4-2 may be grounded through a resistor.

Figure 2:
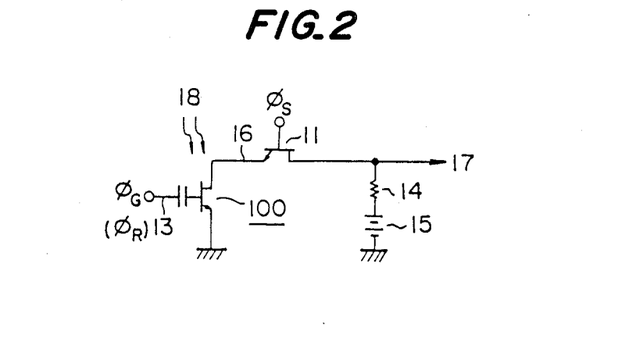
FIG. 2 is a circuit diagram showing an equivalent circuit thereof.

FIG. 2 shows an equivalent circuit of the picture cell shown in FIG. 1 and the operation of the picture cell will be explained with reference to FIG. 2.

When the input light 18 is incident to the picture cell, the light excited holes are stored in the gate regions 4-1 so that the light signal is written therein.

Next, when the pulse voltage $\phi_s$ is applied to the base (or gate) of the transistor 11, the voltage at the power supply 15 is applied across the source and the drain of the static induction transistor 100 as shown in FIG. 1 and if the pulse voltage $\phi_G$ is further applied to the gate region 4 so that the static induction transistor 100 becomes conductive, the drain current corresponding to the light input 18 is derived from the output terminal 17. The output signal derived from the output terminal 17 varies depending upon the intensity of the light input 18. The amplification factor of the static induction transistor 100 is higher than $10^3$ which is higher at least by one order than a conventional bipolar transistor. Furthermore, the dynamic range of the output signal is large. The capacitor which is connected to the gate is provided in order to block the direct current and to store the light signal.

While the picture cell per se of the solid-state image sensor device of the type described above has various advantageous properties as described above, the inventors have found that a novel readout process is required when a plurality of picture cells of the type described above are two-dimensionally arranged to form a two-dimensional solid-state image sensor device.

The reasons follow in detail. When a television signal is obtained from the two-dimensional solid-state image sensor device, the storage and readout of the video signal must be repeated carried out per field or frame unit. It follows, therefore, that the video signal is required to be stored in each cell after the readout of the video signal from one picture cell or from each of the picture cells arranged in one horizontal line (corresponding to one horizontal scanning) is completed and before the readout of the video signal from the same one picture cell or from each of the same picture cells arranged in the same one horizontal line during the next field or frame. Therefore, immediately after the readout from one picture cell or from each of the picture cells arranged in one horizontal line is completed, it is necessary that the same picture cell is refreshed (cleared) and the storage of a new video signal starts.

In a conventional two-dimensional solid-state image sensor device the type in which photodiodes and MOS transistor are combined, carriers corresponding to the intensity of light incident to the photodiode are supplied to the source junction of the MOS transistor, while the MOS transistor is interrupted, thereby rendering the MOS transistor conductive. Simultaneously, a transistor which is connected to the drain of the MOS transistor is rendered conductive so that a charge current flows from the drain to the source. An output signal is obtained depending upon an amount of the charge current. Therefore, the readout process of one picture cell corresponds to the refreshment of that picture cell. Thus, a video signal can be obtained by rendering either of the pulse $\phi_G$ or $\phi_s$ ON precedingly; i.e., the pulse $\phi_G$ to be applied to the gate of the MOS transistor or the pulse $\phi_s$ to be applied to the gate of a transistor connected between the drain of the MOS transistor and a terminal of a video power supply (serving also as an output terminal).

On the other hand, in the above-described solid-state image sensor device of the type in which the light signal is stored in the gate region of the static induction transistor and the video signal is derived therefrom by controlling the current flowing between the source and the drain in response to the potential of the gate region, it is impossible to store a new video signal unless the video signal stored in the gate region is refreshed immediately after the video signal is readout. As a result, the video signal cannot be obtained.

Figure 3:
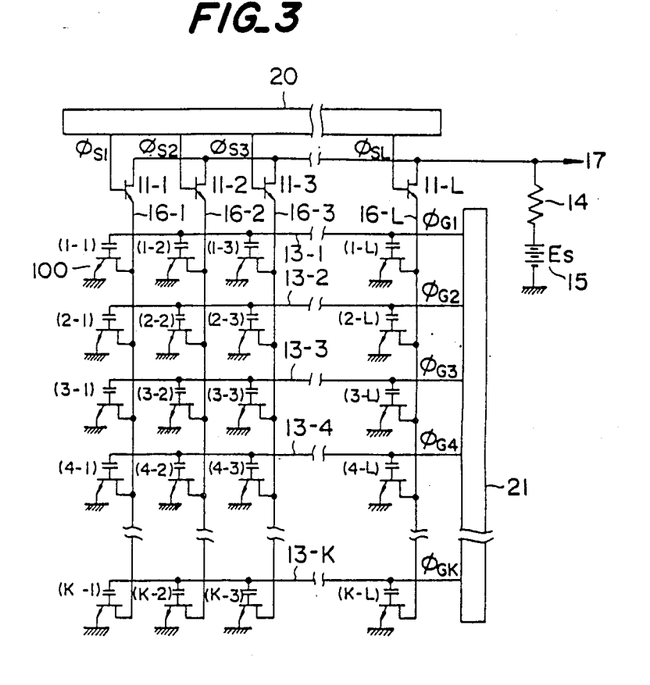
FIG. 3 is a circuit diagram showing a two-dimensional solid-state image sensor device having the picture cells of the type as shown in FIG. 1.
Figure 4:
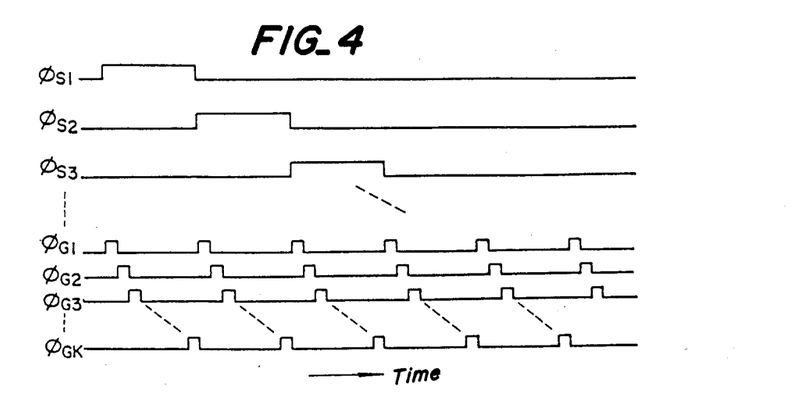
FIG. 4 is a timing chart used to explain the operations thereof.

With this in view, the image sensor device of this type employs the circuit arrangement as shown in FIG. 3 in which a vertical scanning circuit 20 is used to sequentially select read lines 16-1, 16-2, . . . , and 16-L while a horizontal scanning circuit 21 is used to sequentially select lines 13-1, 13-2, . . . , and 13-K. As illustrated in FIG. 4, in response to the pulse $\phi_{s1}$, the read line 16-1 is selected and during the period of this pulse $\phi_{s1}$, the pulses $\phi_{G1}$, $\phi_{G2}$, . . . , and $\phi_{GK}$ are sequentially selected. The video signal in the picture cells (1-1), (2-1), . . . , and (K-1) which are connected to the read line 16-1 are read out. Thereafter in response to the next pulse $\phi_{s2}$, the read line 16-2 is selected and during the period of this pulse $\phi_{s2}$, the pulses $\phi_{G1}$, $\phi_{G2}$, . . . , and $\phi_{GK}$ are sequentially selected. When the pulses $\phi_{s3}$, $\phi_{s4}$, . . . , and $\phi_{sL}$ are sequentially selected in this manner, the light signals stored in the respective gate regions 4-1 of the picture cells (1-1), (2-1), . . . , and (K-1) which are connected to the read line 16-1, of which the read out selection is completed, will not be refreshed at all. Therefore, in order to refresh the gate regions 4-1 of these picture cells (1-1), (2-1), . . . , and (K-1) which are connected to the read line 16-1, it may be proposed to increase the voltage level of the gate pulses $\phi_{G1}$, $\phi_{G2}$, . . . , and $\phi_{GK}$ so that the light signals stored in the gate regions 4-1 are discharged. In this case, however, all the light signals stored in the picture cells connected in common to the selection line 13-1, 13-2, . . . , and 13-K are also discharged, so that it is impossible to attain the two-dimensional image readout.

SUMMARY OF THE INVENTION

One of the objects of the present invention is therefore to provide a one-cell-with-one-transistor type two-dimensional solid-state image sensor device in which the above disadvantages are removed in such a way that one static induction transistor with a high degree of light sensitivity is used both for the detection of the light image and for switching.

Another object of the present invention is to provide a two-dimensional solid-state image sensor device of the type described above which is also adapted to obtain a video signal.

According to the present invention, there is provided a two-dimensional solid-state image sensor device in which a plurality of shielding gate regions are arranged in a manner that the gate regions arranged in either of the column or row direction of picture cells are electrically common, while the shielding gate regions in the other direction, i.e., in the row or column direction are electrically isolated from each other, so that voltage is applied to the shielding gate regions independently.

In another aspect of a two-dimensional solid-state image sensor device of the type described above according to the present invention, a plurality of selection lines which connect the first gate regions of a plurality of picture cells in common in the column direction via capacitances are sequentially selected during one horizontal scanning period (1H) so as to apply a readout pulse voltage to the first gate regions. A plurality of signal readout lines which connect the first or one main electrode regions of a plurality of picture cells in common in the row direction are sequentially selected during the same one horizontal scanning period, so that a readout pulse voltage is sequentially applied to the first main electrode regions. As a result, the video signals stored in the picture cells selected by the one selection line are sequentially read out, and a refresh voltage having a polarity opposite to that of the readout pulse voltage is applied to a refresh line which connects the second gate regions of the picture cells in common in the column direction which correspond in common to one selection line, of which the readout has been completed, whereby the charges stored in the first gate regions are discharged.

According to a further aspect of the present invention, there is provided a two-dimensional solid-state image sensor device, in which a plurality of signal readout lines which connect the first main electrode regions of the picture cells in common in the row direction are sequentially selected during one horizontal scanning period (1H) so that a readout pulse voltage is applied to the first main electrode regions. A plurality of selection lines which connect the first gate regions of the picture cells in common in the column direction via capacitances are sequentially selected during one horizontal scanning period so that a readout pulse voltage is applied to the first gate regions. As a result, the video signals stored in the picture cells selected by the one selection line are sequentially read out, and a refresh voltage having a polarity opposite to that of the readout pulse voltage is applied to a refresh line which connects the picture cells in common in one row which corresponds in common to one signal readout line, of which the readout has been completed, whereby the charges stored in the first gate regions are discharged.

The above and other objects, effects, features and advantages of the present invention will become more apparent from the following description of preferred embodiments thereof taken in conjunction with the accompanying drawings.

DETAILED DESCRIPTION OF THE PREFERRED EMBODIMENTS

Same reference numerals are used to designate similar or corresponding portions throughout the figures.

Figure 5:
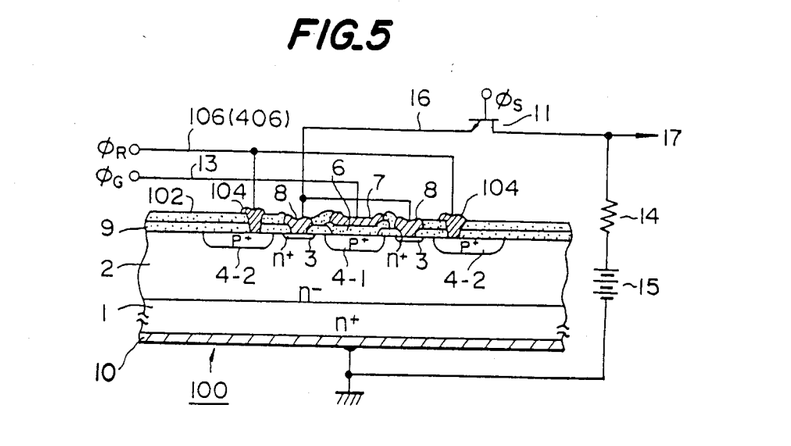
FIG. 5 is a sectional view showing an embodiment of a picture cell in a two-dimensional solid state image sensor device in accordance with the present invention.

FIG. 5 shows, in cross section, an embodiment of one cell 100 of a solid-state image sensor device in accordance with the present invention. The picture cell 100 is composed of a static induction transistor having an isolation layer 102 of, for example, PSG (Phosphor Silicate Glass) formed on the oxide film 9. An aperture is formed through the isolation layer 102 and the oxide film 9 thereunder so as to expose one portion of the shielding gate region 4-2, so that a shielding gate electrode 104 is formed in this aperture. The shielding gate electrode 104 is connected to a line 106 so that a refresh (clear) pulse $\phi_R$ is applied to the electrode 104. Only a readout gate pulse $\phi_G$ is applied to a line 13 which is connected to the control gate electrode 7.

Figure 6:
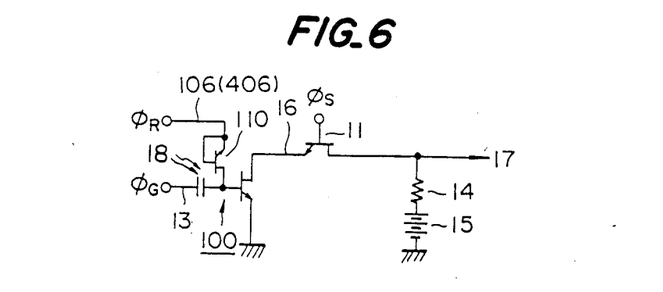
FIG. 6 is a circuit diagram showing an equivalent circuit thereof.

FIG. 6 shows an equivalent circuit of the picture cell shown in FIG. 5. A parasitic transistor 110 is formed by the control gate region 4-1, the channel region 2 and the shielding gate region 4-2. For instance, when the shielding gate electrode 104 is negatively biased relative to the control gate electrode 7, the transistor 110 functions only as a resistor. Therefore, the charge stored in the control gate region 4-1 can be discharged through the transistor 110, so that the picture cell 100 can be refreshed. This will be described in more detail with reference to FIG. 7.

Figure 7:
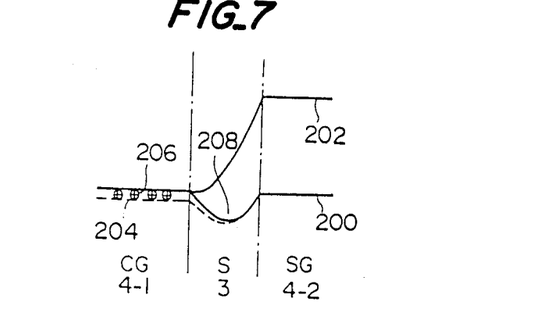
FIG. 7 is an energy band diagram used to explain the operation of picture cell shown in FIG. 5.

FIG. 7 schematically shows the control gate (CG) region 4-1, the source (S) (or drain (D)) region 3 and the shielding gate (SG) region 4-2. It is to be noted that the solid lines 200 and 202 and the broken line 204 indicate the upper limit level of the valence electron band. When the light 18 (See FIG. 1) is incident to a portion in the vicinity of the control gate region 4-1, the electron-hole pairs are produced. The holes 206 which are separated from the electrons by the diffusion potential difference are mostly stored in the control gate region 4-1. As a result, the potential at the control gate region 4-1 slightly drops as indicated by the broken line 204.

When a voltage is not externally applied to the shielding gate electrode 104, the potential at the shielding gate electrode 104 is substantially equal to that of the control gate region 4-1 as indicated by the solid line 200. When a negative voltage is applied to the shielding gate electrode 104, its potential rises so that a potential well 208 disappears, as indicated by the solid line 202. Therefore, the holes 206 which have been stored in the control gate region 4-1 flow into the shielding gate region 4-2 and then are discharge to the negative power supply $\phi_R$. After the holes 206 have been discharge, if the potential at the shielding gate region 4-2 is restored to a normal level, then the control gate region 4-1 is ready to respond to the incident light 18 to store the holes 206 again. The refreshing of the control gate region 4-1 is carried out in the manner described above.

Figure 8:
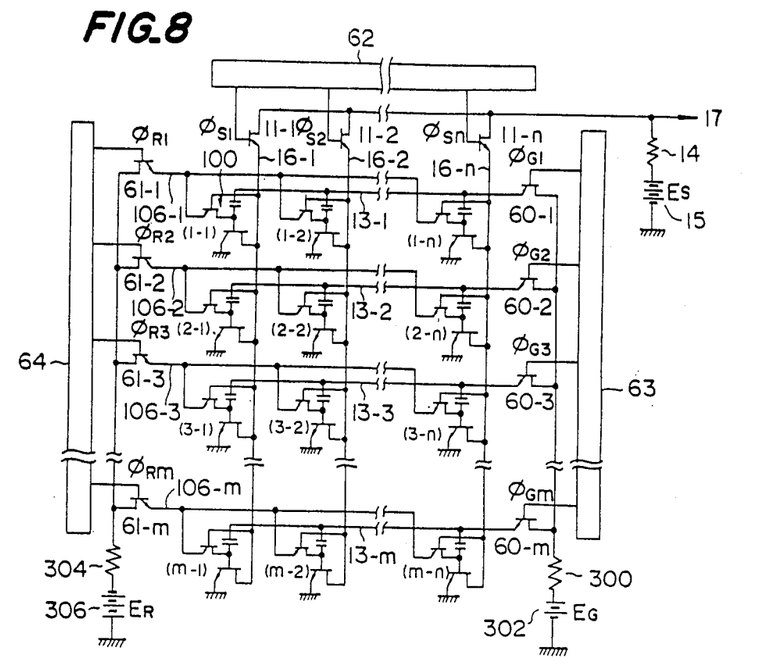
FIG. 8 is a circuit diagram showing an embodiment of a two-dimensional solid-state image sensor device in accordance with the present invention.
Figure 9:
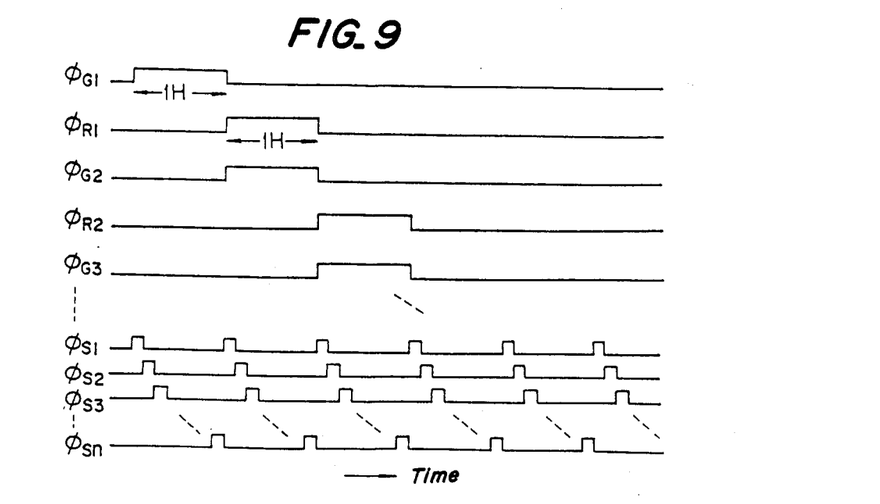
FIG. 9 is a timing chart used to explain the operations thereof.

FIG. 8 shows an embodiment of a two-dimensional solid-state image sensor device in accordance with the present invention and FIG. 9 illustrates a timing chart used to explain the operations thereof.

In FIG. 8, the signal readout lines 16-1, 16-2, ..., and 16-n are connected respectively through switching transistors 11-1, 11-2, ..., and 11-n to an output terminal 17. In response to the pulses $\phi_{s1}, \phi_{s2}, \ldots$, and $\phi_{sn}$ selected from a horizontal scanning circuit 62, the switching transistors 11-1, 11-2, ..., and 11-n sequentially selects the read lineout 16-1, 16-2, ..., and 16-n, so that the video voltage is applied to the drain regions of the respective picture cells 100 of the selected row. The selection lines 13-1, 13-2, ..., and 13-m are connected through switching transistors 60-1, 60-2, ..., and 60-m and a resistor 300 to a power supply 302 of a positive voltage $E_G$.

A readout vertical scanning circuit 63 applies the readout gate pulses $\phi_{G1}, \phi_{G2}, \ldots$, and $\phi_{Gm}$ to the gates (bases) of the switching transistors 60-1, 60-2, ..., and 60-m, respectively. As shown in FIG. 9, each of the readout gate pulses $\phi_{G1}, \phi_{G2}, \ldots$, and $\phi_{Gm}$ is rendered to "ON" state during one horizontal scanning period (1H) and is shifted by 1H period from each other. The repetition period corresponds to one field period (1V). As a result, the voltage $E_G$ is applied to the selection lines 13-1, 13-2, ..., and 13-m from the power supply 302 through the resistor 300 sequentially during each one horizontal scanning period (1H). As shown in FIG. 9, the pulses $\phi_{s1}, \phi_{s2}, \ldots$, and $\phi_{sn}$ have a pulse width or duration corresponding to one picture cell period and are shifted by the same one picture cell period from each other. The repetition period of these pulses is equal to 1H. As a result, the voltage $E_s$ from the power supply 15 is applied sequentially to the respective picture cells 100 via the resistor 14 during one picture cell period.

The lines 106-1, 106-2, ..., and 106-m of the shielding gate electrodes 104 (See FIG. 5) of the picture cells 100 in each column are connected in common in each of the columns and are connected respectively through switching transistors 61-1, 61-2, ..., and 61-m and a resistor 304 to a power supply 306 of a negative voltage $E_R$. The gates (or bases) of the switching transistors 61-1, 61-2, ..., and 61-m are connected to a refresh vertical scanning circuit 64 so that the refresh (clear) pulses $\phi_{R1}, \phi_{R2}, \ldots$, and $\phi_{Rm}$ are sequentially supplied to the gates of the switching transistors 61-1, 61-2, ..., and 61-m.

The refresh pulses $\phi_{R1}, \phi_{R2}, \ldots,$ and $\phi_{Rm}$ are generated while the corresponding readout gate pulses $\phi_{G1}, \phi_{G2}, \ldots,$ and $\phi_{Gm}$ are in "OFF" state. That is, it is sufficient that the refresh pulse $\phi_R$ is rendered to "ON" state during the period that the read out gate pulse $\phi_G$ is in "OFF" state. The repetition period of the refresh pulses $\phi_{R1}, \phi_{R2}, \ldots,$ and $\phi_{Rm}$ is equal to 1V, like the readout gate pulses $\phi_{G1}, \phi_{G2}, \ldots,$ and $\phi_{Gm}$. It is sufficient that the pulse duration of the refresh pulse is such that the charge stored in the control gate region 4-1 (See FIG. 5) of the picture cell 100 is sufficiently discharged.

The discharge of the stored charge in the control gate region 4-1 is dependent upon a potential applied to the shielding gate region 4-2 (see FIG. 5) and a time period during which the potential is applied. According to the embodiment of the present invention, the voltage $E_G$ is so selected that the pulse duration of the refresh pulses $\phi_{R1}, \phi_{R2}, \ldots,$ and $\phi_{Rm}$ is equal to 1H. The voltage $E_R$ may be reduced so that the pulse duration of the refresh pulses $\phi_{R1} \phi_{R2}, \ldots,$ and $\phi_{Rm}$ may be increased, as a matter of course. While in this embodiment, the refresh pulses $\phi_{R1} \phi_{R2}, \ldots,$ and $\phi_{Rm}$ immediately follow the corresponding readout gate pulses $\phi_{G1}, \phi_{G2}, \ldots,$ and $\phi_{Gm}$, it is to be understood that the refresh pulses $\phi_{R1}, \phi_{R2}, \ldots,$ and $\phi_{Rm}$ may be delayed with respect to the corresponding readout gate pulses $\phi_{G1}, \phi_{G2}, \ldots,$ and $\phi_{Gm}$ as long as the refresh operation is completed in such a way that in response to the incident light 18 (See FIG. 1), the charge may sufficiently be stored after the refreshing operation. In either case, the voltage $E_R$ is sequentially applied through the resistor 304 to the shielding gates 4-2 (See FIG. 5) of the picture cells 100, only when the refresh pulses $\phi_{R1} \phi_{R2}, \ldots,$ and $\phi_{Rm}$ are in "ON" state.

As described above it is preferable that the readout vertical scanning circuit 63 and the refresh vertical scanning circuit 64 are synchronized in operation with each other. For instance, as shown in FIG. 9, in response to the pulse $\phi_{G1}$, the selection line 13-1 is selected and during the period of the pulse $\phi_{G1}$, the readout gate pulses $\phi_{s1}, \phi_{s2}, \ldots,$ and $\phi_{sm}$ are generated, so that the video signals in the picture cells (1-1), (1-2), . . . , and (1-n) are read out. Succeedingly, in response to the pulse $\phi_{G2}$, the selection line 13-2 is selected and during the period of the pulse $\phi_{G2}$ the video signals in the picture cells (2-1), (2-2), . . . , and (2-n) are read out in like manner. During this period the pulse voltage $\phi_{R1}$ is applied to the picture cells (1-1), (1-2), . . . , and (1-n), so that the gate regions of these picture cells are refreshed. In order to refresh the picture cells, the voltage $E_R$ to be applied to the lines 106-1, 106-2, . . . , and 106-m for the refreshing operation must be opposite in polarity to the readout gate voltage $E_G$.

Further, the scanning circuits 62, 63 and 64 may be formed by registers in a conventional manner.

According to the first embodiment, the picture cells 100 in one column corresponding to one scanning line are read out and then refreshed independently of the following readout operation while the picture cells 100 of the following column are being read out. This operation is repeated sequentially in the vertical direction so that one field of a television picture can be scanned including the readout and the refreshing.

Figure 10:
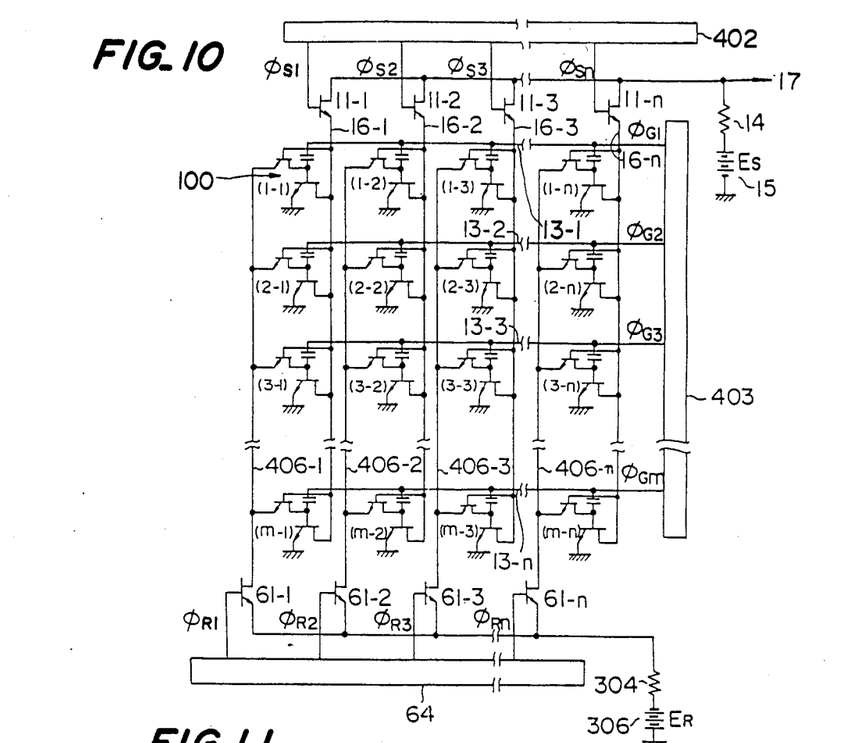
FIG. 10 is circuit diagram showing another embodiment of a two-dimensional solid-state image sensor device in accordance with the present invention.
Figure 11:
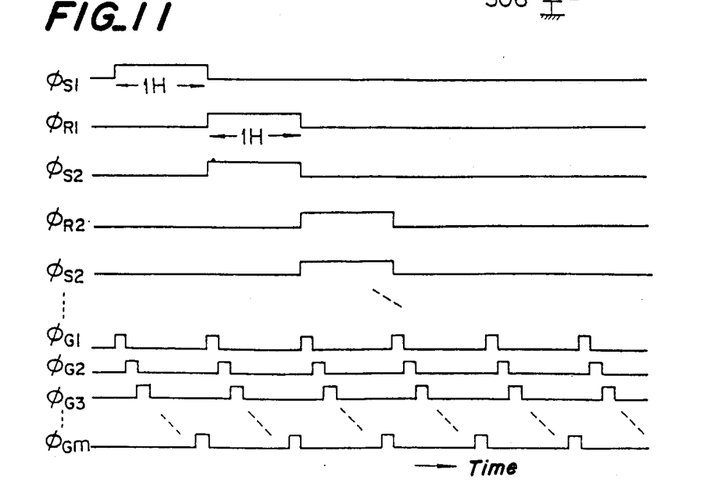
FIG. 11 is a timing chart used to explain the operations thereof.

FIG. 10 shows a second embodiment of a solid-state image sensor device in accordance with the present invention and FIG. 11 illustrates a timing chart used to explain the operations thereof.

In FIG. 10, the signal readout line 16-1, 16-2, . . . , and 16-n are connected respectively through the switching transistors 11-1, 11-2, . . . , and 11-n to the output terminal 17. The pulses $\phi_{s1}, \phi_{s2}, \ldots,$ and $\phi_{sn}$ from a vertical scanning circuit 402 select the switching transistors 11-1, 11-2, . . . , and 11-n, so that in response to the pulses $\phi_{s1}, \phi_{s2}, \ldots,$ and $\phi_{sn}$, the read lines 16-1, 16-2, . . . , and 16-n are sequentially selected. As a result, the video voltage is applied to the drain regions of the picture cells 100 of a selected row. A horizontal scanning circuit 403 supplies the readout gate pulses $\phi_{G1}, \phi_{G2}, \ldots,$ and $\phi_{Gm}$ to the selection lines 13-1, 13-2, . . . , and 13-m. The pulses $\phi_{s1}, \phi_{s2}, \ldots,$ and $\phi_{sn}$ which are applied to the drain regions of the picture cells 100 are rendered to "ON" state during one horizontal scanning period (1H) and are shifted from each other by 1H. Here, the scanning circuits 402 and 403 may be formed by registers in a conventional manner. The repetition period is equal to one field period (1V). As a result, the voltage Es is sequentially applied to the readout lines 16-1, 16-2, . . . , and 16-n from the power supply 15 through the resistor 14 during one horizontal scanning period. As shown in FIG. 11, the repetition period of the pulses $\phi_G, \phi_{G2}, \ldots,$ and $\phi_{Gm}$ is equal to 1H and their phases are shifted from each other by one picture cell period. The pulse duration is equal to one picture cell period. Therefore, the horizontal scanning circuit 403 applies the readout gate pulse $\phi_s$ to the respective picture cells 100 during one horizontal scanning period. That is, the scanning operation in this embodiment is quite opposite to that of the first embodiment described with reference to FIGS. 8 and 9.

Lead wires 406-1, 406-2, . . . , and 406-n of the shielding gate electrodes 104 (See FIG. 5) of the picture cells 100 in each row are connected in common in each of the rows and are connected, respectively, through the switching transistors 61-1, 61-2, . . . , and 61-n and the resistor 304 to the power supply 306 of a negative voltage $E_R$. The gates (or bases) of the switching transistors 61-1, 61-2, . . . , and 61-n are connected to the refresh vertical scanning circuit 64 so that the refresh (clear) pulses $\phi_{R1} \phi_{R2}, \ldots,$ and $\phi_{Rn}$ are supplied sequentially to the gates of the switching transistors 61-1, 61-2, . . . , and 61-n.

The relationship between the refresh pulses $\phi_{R1} \phi_{R2}, \ldots,$ and $\phi_{Rn}$ and the pulses $\phi_{s1}, \phi_{s2}, \ldots,$ and $\phi_{sn}$ to be applied to the drain regions of the picture cells 100 and polarity of the refresh pulses may be equal to the relationship between the refresh pulses $\phi_{R1} \phi_{R2}, \ldots,$ and $\phi_{Rn}$ and the readout gate pulses $\phi_{G1}, \phi_{G2}, \ldots,$ and $\phi_{Gm}$ and the polarity of the refresh pulse in the first embodiment described above with reference to FIGS. 8 and 9.

According to the second embodiment, the picture cells 100 which are connected to one signal readout line are read out and thereafter refreshed independently of the following readout while the picture cells 100 of the next signal readout line are being readout. The picture cells are scanned sequentially in this manner in the vertical direction so that one field of a television picture is scanned including the readout and the refreshing.

A two-dimensional solid-state image sensor device in accordance with the present invention comprises a picture cell of the type as shown in FIG. 5. In order to provide a static induction transistor as the picture cell, the impurity concentration in the n⁻ channel region 2 must be substantially less than $1 \times 10^{16}$ cm$^{-3}$ and the impurity concentration of the gate, source and drain regions must be substantially higher than $1 \times 10^{18}$ cm$^{-3}$.

In order that the drain current does not flow even when the gate voltage is 0V, the sizes and impurity concentrations are so selected that the portion between the gates and the portion between the gate and the channel are depleted only at a diffusion potential. It is apparent that this requirement is easily satisfied, if the gate thickness is increased and the distance between the gates is reduced. Since the light amplification is needed, care should be so taken that no crystal dislocation or defect results in each step. For instance, in the case of the boron diffusion of the p$^+$ gate, an atom selected from the group IV is used so as to prevent the lattic distortion. In order to prevent the recombination of the electrons and holes in the n$^-$ channel region, the carrier life in the channel region must be longer. Thus, in the last step, gettering of a heavy metal is carried out so that the carrier life in the channel region is increased.

In order to provide a two-dimensional solid-state image sensor device with a higher degree of integration, it is preferable to use the static induction transistors of separated gate type in which the control gate 4-1 is separated from the shielding gate 4-2 as shown in FIG. 5, so that the picture cells can advantageously be separated from each other.

Figure 12A:
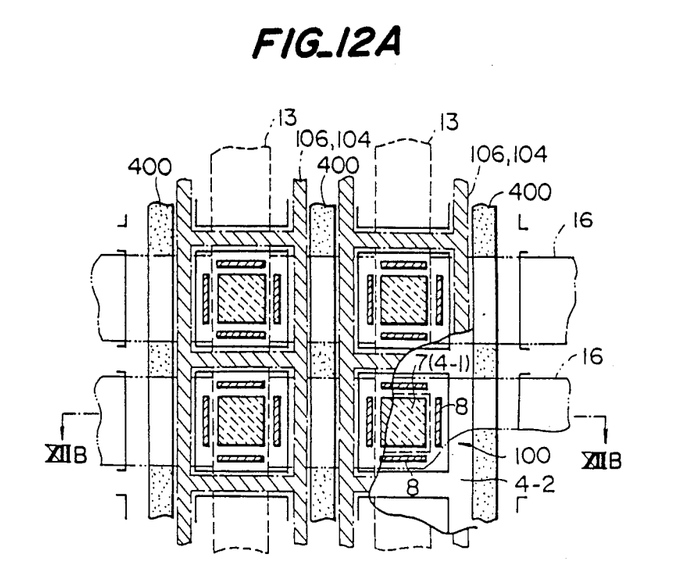
FIG. 12A is a top plan view showing an embodiment of a two-dimensional solid-state image sensor device in accordance with the present invention.
Figure 12B:
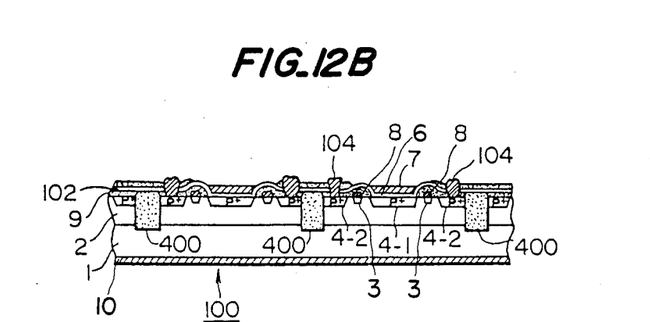
FIG. 12B is a sectional view taken along the line XIIB—XIIB of FIG. 12A.

FIG. 12A shows a top plan view of the picture cell as shown in FIG. 5 while FIG. 12B shows a cross sectional view thereof. The shielding gate regions 4-2 surround the control gate region 4-1 and the drain (drain electrode) 3 and are extended in the longitudinal direction (in the column direction in FIG. 8) so as to be arranged in common to all the picture cells in one column. The shielding gates 4-2 are connected to the electrode lead wire 106. Each column is isolated from each other by means of an isolating oxide layer 400. The readout line 16 is made into electrical contact to the drain 3 via the drain electrode 8 at the hatched portion. The remaining portion of the readout line 16 is electrically isolated. The readout line has an aperture or window which is so formed as to uncover the control gate region 4-1. The selection line 13 and the control gate 4-1 form a capacitance at the hatched portion of the control gate 4-1 or the gate electrode 7. It is required that this electrode 7 is transparent to the light signal.

Figure 13A:
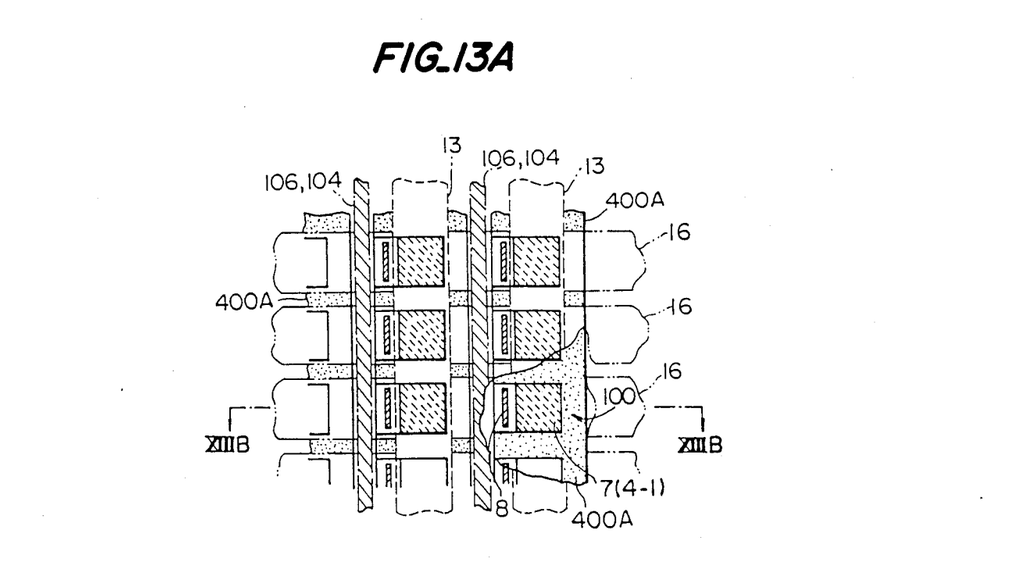
FIG. 13A is a top plan view showing a further embodiment of a two-dimensional solid-state image sensor device in accordance with the present invention.
Figure 13B:
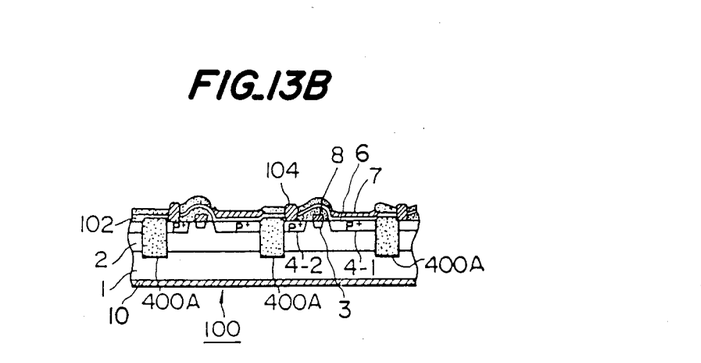
FIG. 13B is a sectional view taken along the line XIIIB—XIIIB of FIG. 13A.

FIGS. 13A and 13B show another embodiment of a picture cell to be used in a solid-state image sensor device in accordance with the present invention. Each picture cell is surrounded by an oxide layer or film 400A of SiO$_2$ and is therefore isolated from each other. The drain region 3 is disposed in opposite only to one of the four sides of the control gate region 4-1. The shielding gate regions 4-2 are arranged per one column in the longitudinal direction in FIG. 13A or in the columu direction in FIG. 8 and are connected in common by means of electrode lines 106.

Figure 14A:
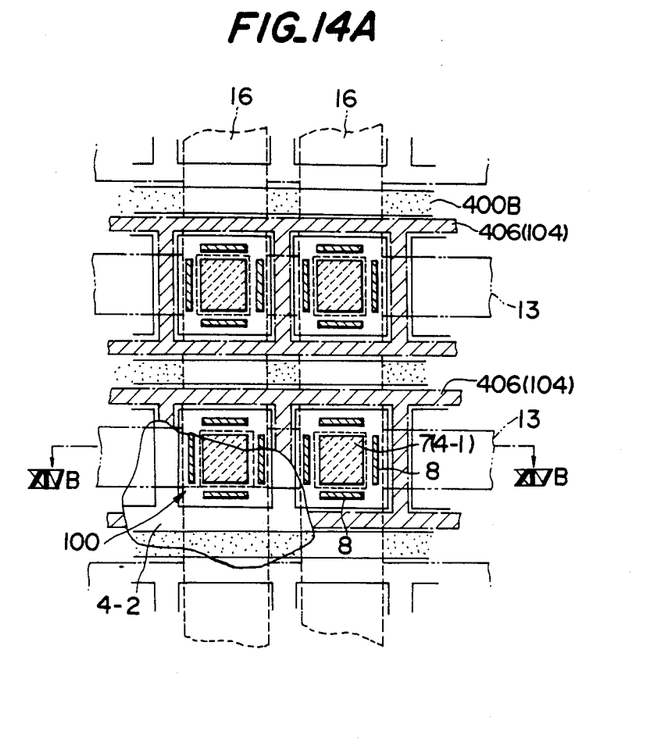
FIG. 14A is a top plan view showing a further embodiment of a two-dimensional solid-state image sensor device in accordance with the present invention.
Figure 14B:
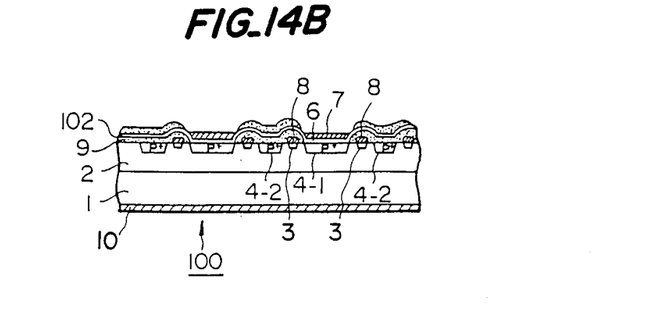
FIG. 14B is a sectional view taken along the line XIVB—XIVB of FIG. 14A.

The picture cells as shown in FIGS. 12A and 12B and FIGS. 13A and 13B are best adapted for use in the first embodiment described above with reference to FIGS. 8 and 9. A picture cell best adapted for use in the second embodiment described above with reference to FIGS. 10 and 11 will be shown in FIGS. 14A and 14B. The shielding gate region 4-2 surrounds the control gate region 4-1 and the drain region (electrode) 3 in a manner that the shielding gate regions 4-2 of the picture cells arranged in the horizontal direction in FIG. 14A (in the row direction in FIG. 10) are connected in common to an electrode line 406. The picture cell rows are isolated from each other by means of isolation oxide layers or film 400B. The readout line 16 is made into electrical contact with a hatched portion, while the remaining portion of the readout line 16 is electrically isolated. The readout line 16 has an aperture or window which is so formed as to expose the control gate region 4-1. The selection line 13 and the control gate region 4-1 constitute a capacitance at the hatched portion corresponding to the control gate region 4-1. The gate electrode 7 corresponding to the control gate region 4-1 must be transparent to light. The embodiment shown in FIG. 11 may be so constructed that the picture cells 100 are surrounded by the oxide such as SiO$_2$ as shown in FIGS. 13A and 13B, as a matter of course.

Figure 15:
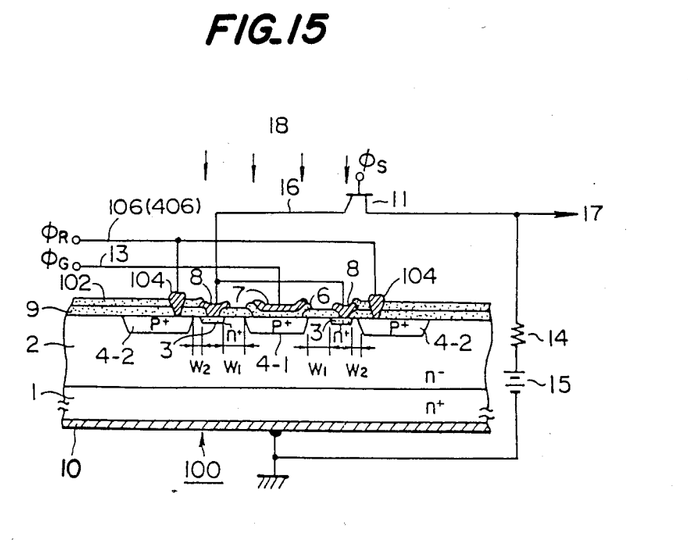
FIG. 15 is a sectional view showing a further embodiment of a picture cell to be used in a two-dimensional solid-state image sensor device in accordance with the present invention.

In the above-described embodiments, it is sufficient that the shielding gate regions 4-2 in each column or row is connected electrically with each other in one column or row. Therefore, as shown the separate shielding gate region 4-2 may be independently formed in each picture cell 100 in the n$^-$ epitaxial layer 2 and the picture cells may be interconnected by means of electrode lines 104 or 406. Alternatively, the shielding gate regions 4-2 of the picture cells in one column or row may be integrally extended in the n$^-$ regions 2 in the column or row direction and there may be provided an electrode lead wire at a connecting portion to be connected to an external circuit FIG. 15 shows a further embodiment of a picture cell to be used in a two-dimensional solid-state image sensor device in accordance with the present invention. The drain region 3 is so located that the distance W$_2$ between the drain region 3 and the shielding gate region 4-2 is sufficiently smaller than the width W$_1$ between the drain region 3 and the control gate region 4-1; i.e., W$_1$ > W$_2$. The depletion region from the control gate region 4-1 is further broadened so that the charge produced by the light excitation can efficiently be stored in the control gate region 4-1.

In the above-described embodiments, the relationship between the drain region 3 and the source region 1 may be reversed and a voltage may be applied to the n$^+$ region 1 from the power supply 15 through the resistor 14. Furthermore, the conduction types of the regions may be reversed. In this case, negative pulses must be applied to the selection lines 13 and the signal readout lines 16, while the positive pulses are applied to these lines in the above-described embodiments. Instead of the negative refresh pulse, a positive refresh pulse is used. In this case, instead of holes, electrons are stored in the gate region.

As described above, according to the present invention, the selection lines are sequentially selected during each one horizontal scanning period so that the video signals are read out from the respective picture cells. While the video signals are read out from the picture cells connected in common to the following selection line, the picture cells connected in common to the previously selected selection line are refreshed independently of the present readout. Therefore, the two-dimensional solid-state image sensor device in accordance with the present invention is best adapted to obtain a television signal. Furthermore, the time duration during which the refresh voltage is applied to the shielding gate can be elongated so that a low refresh voltage may be sufficiently used and consequently the construction of the power supply can be simplified.

Furthermore, according to the present invention, the plural shielding gate regions are electrically in common in the columns or rows of the picture cells while the plural shielding gate regions are disposed electrically independently in the remaining row or column direction, so that voltages can be applied to the plural shielding gates independently. As a result, the light-energy output characteristic of each line can be desirably varied by controlling the voltage to be applied to the shielding gate regions and the load resistors connected to the power supply. Therefore, a very interesting image can be reproduced by employing this line-by-line adjustment.

What is claimed is:

1. A two-dimensional solid-state image sensor device, comprising:
   (a) a plurality of picture cells which are two-dimensionalally arranged in column and row directions; each picture cell comprising:
      (a-1) a static induction transistor having first and second main electrode regions formed of semiconductor regions with one conductivity type which are disposed on opposite sides of a high resistance semiconductor channel region, and first and second gate regions formed of semiconductor regions with the other conductivity type which are adjacent to said channel region to control a current flowing between said first and second main electrode regions, and
      (a-2) a transparent electrode disposed via a capacitance on at least a portion of said first gate region, in a manner that light is incident through said transparent electrode to said first gate region in which the charge produced by the light excitation is stored to control said current;
   (b) a plurality of selection lines, each of which connects the first gate regions of said picture cells in each column in common via the capacitances;
   (c) a plurality of signal readout lines, each of which connects the first main electrode regions of said picture cells in each row in common, each picture cell being selected in said column and row directions so that a signal is read out therefrom; and
   (d) said second gate regions of said picture cells being electrically connected in common in either of said column or row direction and being electrically isolated in the remaining row or column direction so that voltages are independently applied to said plurality of second gate regions.

2. A two-dimensional solid-state image sensor device as claimed in claim 1, wherein an insulation layer is disposed between said first gate region and said transparent electrode to form said capacitance.

3. A two-dimensional solid-state image sensor device as claimed in claim 1, wherein a selection pulse for selecting a picture cell is applied to one of said first and second main electrode regions, a readout gate pulse for controlling the readout of said picture cell is applied to said transparent electrode and a refresh pulse for refreshing said charge stored in said first gate region is applied to said second gate region.

4. A two-dimensional solid-state image sensor device as claimed in claim 1, wherein said first gate region and one of said main electrode region are surrounded by said second gate region.

5. A two-dimensional solid-state image sensor device as claimed in claim 1, wherein the picture cells in one column or row are isolated from the picture cells in the adjacent columns or rows by an isolating oxide layer.

6. A two-dimensional solid-state image sensor device as claimed in claim 1, wherein each of said plurality of picture cells is isolated from each other by an insulation layer.

7. A two-dimensional solid-state image sensor device as claimed in claim 6, wherein one of said main electrode region is disposed in opposite to one side of said first gate region.

8. A two-dimensional solid-state image sensor device, comprising:
   (a) a plurality of picture cells which are two-dimensionalally arranged in column and row directions; each picture cell comprising:
      (a-1) a static induction transistor having first and second main electrode regions formed of semiconductor regions with one conductivity type which are disposed on opposite sides of a high resistance semiconductor channel region, and first and second gate regions formed of semiconductor regions with the other conductivity type which are adjacent to said channel region to control a current flowing between said first and second main electrode regions, and
      (a-2) a transparent electrode disposed via a capacitance on at least a portion of said first gate region, in a manner that light is incident through said transparent electrode to said first gate region in which the charge produced by the light excitation is stored to control said current;
   (b) a plurality of selection lines, each of which connects the first gate regions of said picture cells in each column in common via capacitances;
   (c) means for sequentially selecting each one of said plurality of selection lines during each one horizontal scanning period so that a readout pulse voltage is applied to said first gate regions;
   (d) a plurality of signal readout lines, each of which connects the first main electrode regions of said picture cells in each row in common, each picture cell being selected in said column and row directions so that a signal is read out therefrom;
   (e) means for sequentially selecting each one of said plurality of signal readout lines during each one horizontal scanning period so that a readout pulse voltage is applied to said first main electrode regions to read out a video signal stored in a picture cell selected by the selected selection line;
   (f) a plurality of refresh lines, each of which connects the second gate regions of said picture cells in each column in common; and
   (g) means for applying a refresh voltage with a polarity opposite to that of said readout pulse voltage to the refresh line which corresponds to one selection line which has been selected previously so that the charge stored in said first gate regions is discharged.

9. A two-dimensional solid-state image sensor device, comprising:
   (a) a plurality of picture cells which are two-dimensionalally arranged in column and row directions; each picture cell comprising:
      (a-1) a static induction transistor having first and second main electrode regions formed of semiconductor regions with one conductivity type which are disposed on opposite sides of a high resistance semiconductor channel region, and first and second gate regions formed of semiconductor regions with the other conductivity type which are adjacent to said channel region to control a current flowing between said first and second main electrode regions, and (a-2) a transparent electrode disposed via a capacitance on at least a portion of said first gate region, in a manner that light is incident through said transparent electrode to said first gate region in which the charge produced by the light excitation is stored to control said current;

(b) a plurality of signal readout lines, each of which connects the first main electrode regions of said picture cells in each row in common;

(c) means for sequentially selecting each one of said plurality of signal readout lines during each one horizontal scanning period so that a readout pulse voltage is applied to said first main electrode regions;

(d) a plurality of selection lines, each of which connects the first gate regions of said picture cells in each column in common via capacitances;

(e) means for sequentially selecting each one of said plurality of selection lines during each one horizontal scanning period so that a readout pulse voltage is applied to the first gate regions to read out a video signal in a picture cell selected by the selected selection line;

(f) a plurality of refresh lines, each of which connects the second gate regions of said picture cells in each row in common; and (g) means for applying a refresh voltage with a polarity opposite to that of said readout pulse voltage to the refresh line which corresponds to one selection line which has been selected previously so that the charge stored in said first gate regions is discharged.

* * * * *